(No Model.)  3 Sheets—Sheet 1.

J. J. & E. T. FAULKNER.
FLOUR BOLT AND MIDDLINGS PURIFIER.

No. 306,600. Patented Oct. 14, 1884.

Attest:
T. Walter Fowler
H. B. Applewhaite

Inventors
James J. Faulkner
Elza T. Faulkner
per attys
N. H. Evans & Co.

(No Model.)  3 Sheets—Sheet 2.

J. J. & E. T. FAULKNER.
FLOUR BOLT AND MIDDLINGS PURIFIER.

No. 306,600.  Patented Oct. 14, 1884.

Attest:  
S. Walter Fowler  
H. B. Applewhaite

Inventors  
James J. Faulkner  
Elza T. Faulkner  
per attys  
N. W. Evans & Co.

(No Model.)   J. J. & E. T. FAULKNER.   3 Sheets—Sheet 3.
FLOUR BOLT AND MIDDLINGS PURIFIER.
No. 306,600.   Patented Oct. 14, 1884.

Attest:
T. Walter Fowler
H. B. Applewhite

Inventors:
James J. Faulkner
Elza T. Faulkner
per atty
N. W. Evans & Co

UNITED STATES PATENT OFFICE

JAMES JONES FAULKNER AND ELZA TAYLOR FAULKNER, OF McMINNVILLE, TENNESSEE.

FLOUR-BOLT AND MIDDLINGS-PURIFIER.

SPECIFICATION forming part of Letters Patent No. 306,600, dated October 14, 1884.

Application filed February 7, 1884. (No model.)

*To all whom it may concern:*

Be it known that we, JAMES JONES FAULKNER and ELZA T. FAULKNER, both of McMinnville, in the county of Warren and State of Tennessee, have invented a new and useful Improvement in Flour-Bolts and Middlings-Purifiers, of which the following is a full, clear, and exact description, reference being had to the accompanying drawings, making a part of this specification, in which—

Figure 1:
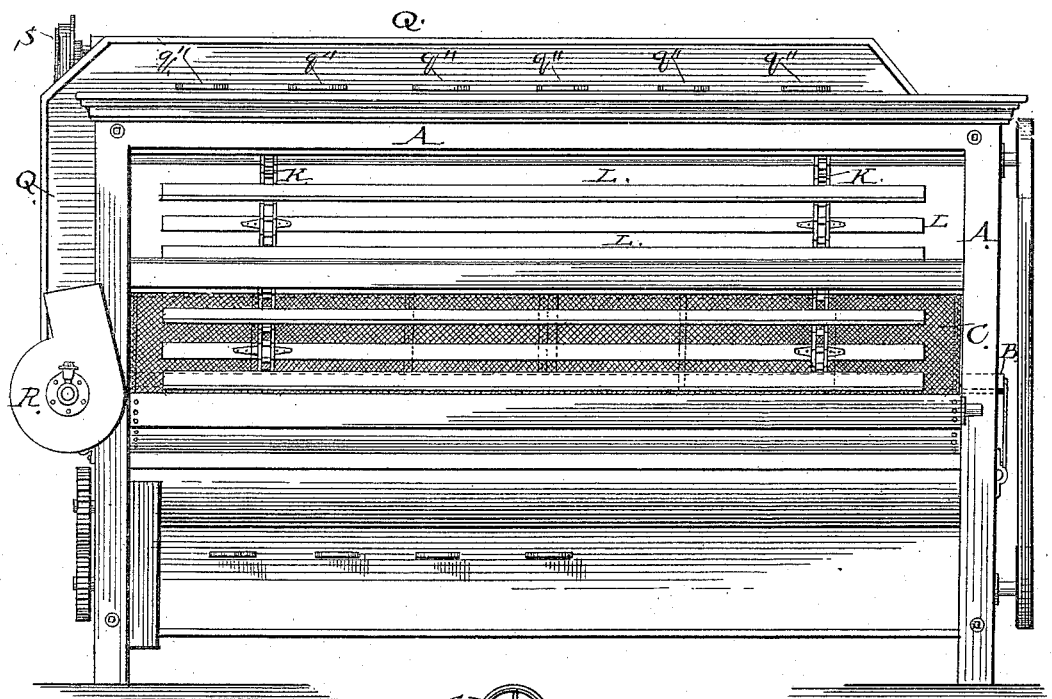
Figure 2:
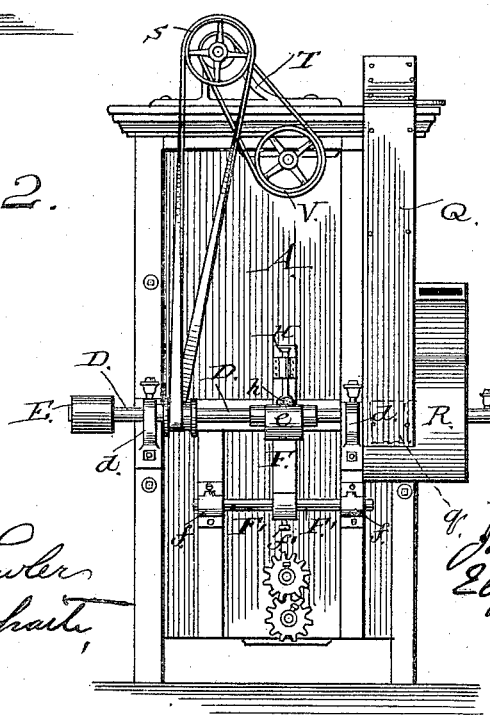
Figure 3:
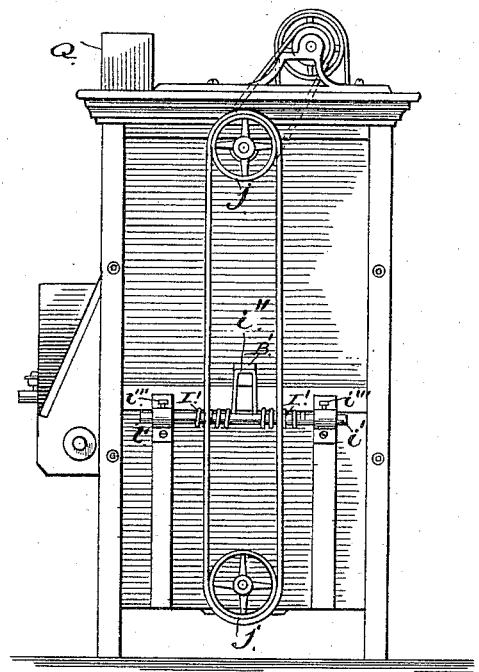
Figure 4:
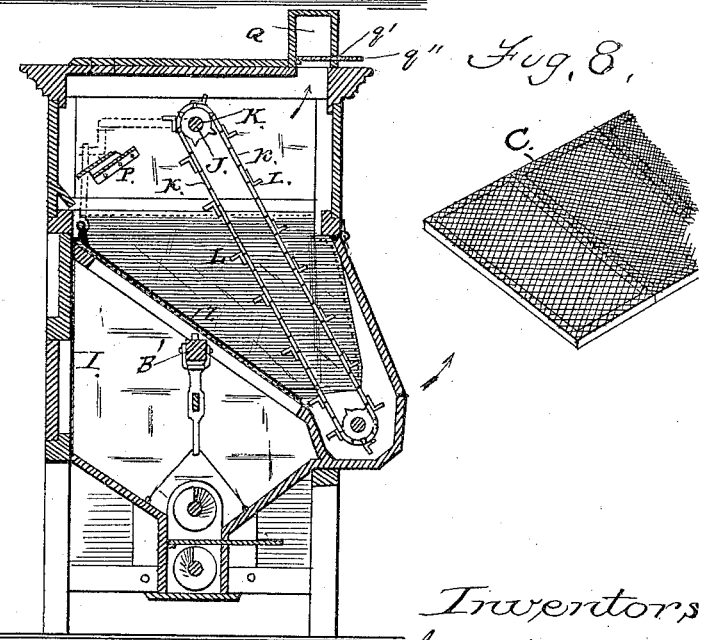
Figure 5:
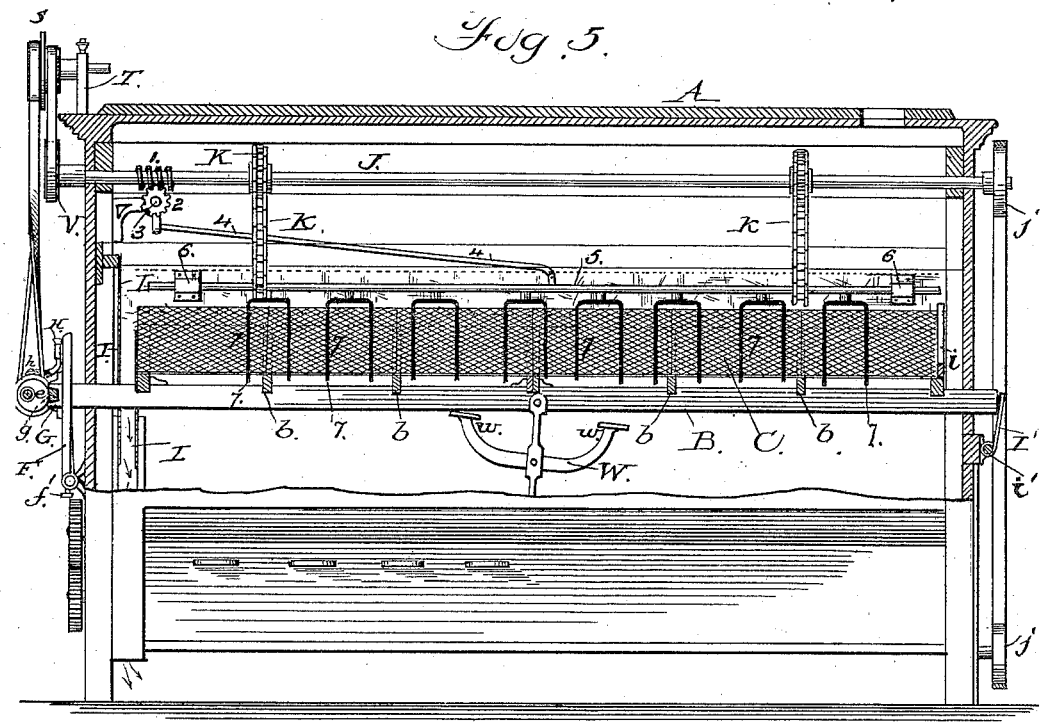

Figure 1 is a front elevation of a flour-bolt with our improvements attached and with the doors removed. Fig. 2 is an end elevation of our machine. Fig. 3 is an elevation of the opposite end, showing the spring. Fig. 4 is a transverse vertical section through $x\,x$ of Fig. 1. Fig. 5 is a longitudinal section. Figs. 6, 7, 8, and 9 are details referred to.

Our invention relates to machines for bolting flour and purifying middlings; and it consists of the several combinations of devices hereinafter explained and claimed, and is an improvement on the patent allowed us on the 23d day of July, 1883.

To enable others skilled in the art to make and use our invention, we will proceed to describe the exact manner in which we have carried it out.

In the drawings, A represents the framework of a flour-bolting chest, with the doors removed, so as to show the interior structure. Through the center of the bolting-chest we secure a longitudinal supporting-frame, B, in which rests the sieve or bolting-cloth C, which is made in sections, with a view to their being readily and easily removed, to be replaced by others when necessary to change the cloth, and these sections are secured to individual frames $b$, fitting into frame B, as shown in Figs. 5 and 8. These individual frames may be dovetailed at their lower inclined edge, so as to prevent their slipping out of position, while at the top they may be secured by screws or other convenient means. These sectional sieves facilitate the operation in making a change in the grade of cloth quickly, without having to remove the supporting-frame. It also secures simplicity in the manufacture of the machine.

It is well known to those skilled in the art that bolting-cloth of the same grade varies in different states of the weather in its working capacity—that is, it will sometimes work the grade of material faster than at other times—and hence a change in the grade of bolting-cloth is required, and having more than one set of these sectional cloths ready to change. A change in the working capacity of the machine may be made in a few minutes, whereas if the cloth were fastened to the main supporting-frame it would take a much longer time to adjust the working of the machine. The central longitudinal bar, B, extends beyond each end of the frame, and the same is transversely inclined, as shown and described in our former application before referred to, and for a purpose therein explained and claimed.

Across one end of the machine is the shaft D, having its bearings in the arms $d\,d$, extending out from the frame A. To one end of this shaft is attached the band-wheel E, and near its center is secured the eccentric $e$, bearing against an adjustable knocker, F, which is attached to the rocker-shaft F', having its bearings in the eyes $f\,f$, attached to the frame below the shaft D. The knocker F has a set-screw, $f'$, by which it may be adjusted to bear more or less against the eccentric $e$, and give the sieve a longitudinal vibrating motion by knocking against the exposed end of the supporting-bar B'.

To the knocker F is secured a box-casting, G, containing the packing $g$, which works against the eccentric $e$. To the knocker F is also attached the oil-cup H, containing the wick $h$, passing directly against the eccentric and forming an automatic oiler. The interior cloth curtain, I, is secured along the upper edge of the sieve and across each end of the same. The object of this curtain is to prevent the unworked material from falling off the sieve into the worked material below. Across the tail end of the sieve is secured the check-strip $i$, to check or hold back the material being bolted and prevent it from pouring over the tail end too fast.

On the opposite end of our machine we attach a double spiral spring, I', which is wound both right and left around and toward the center of the shaft $i'$, with a central loop, $i''$, in the wire to form a lever to bear against the exposed end of the middle or supporting bar, B', of the sieve, to react against the vibrating motion given to the sieve by the eccentric and knocker at the opposite end. The shaft $i'$, on which the wire spring is formed, has bearings with set-screws $i'''$, the purpose of which is to tighten the shaft firmly in its bearings. Now, by turning the shaft after releasing it from the set-screws $i'''$, the pressure of the spring can be increased or diminished according to the way the shaft may be turned, and the shaft can then be again firmly fixed at any degree of tension of the spring that may be desired by again tightening the set-screws $i'''$, the wire spring being rigidly attached to the shaft.

Longitudinally through the upper part of the machine passes a shaft, J, on the outer end of which are the band-wheels $j$ V, by which motion is given to the shaft, and through the shaft to the spiral conveyers in the bottom of the machine.

On the shaft J we secure two or more sprocket-wheels, K, carrying suitable chain belts, $k$, to which are attached the elevator-buckets L, extending the entire length of the sieve.

Within the elevator-box is a shaft, M, carrying a like number of sprocket-wheels, around which pass the belts $k$, and by means of which the elevator-buckets are caused to pass through the elevator-box and return the middlings or flour to the top of sieve to be worked over again and again until they are thoroughly worked, the bran and fluff all the while working toward the tail end of the purifier and dropping over the end of the sieve into the discharge-spout N, for discharging all impurities.

The main object in using the sprocket-wheels is to have a positive power for raising the elevator-buckets, and thus prevent one end of these long buckets traveling faster than the other. It would be impossible to secure this uniform speed by the ordinary friction-power where the belts are liable to slip. The sieve C having a lateral inclination instead of a longitudinal one, the middlings or flour placed thereon to be cleaned of fluff, bran, or foreign substances glide freely on the incline by their own gravitation. The middlings or flour, being of greater specific gravity than the bran or fluff, occupy a position next the sieve while passing over the cloth, at the same time forcing the fluff and bran to move on top as if floating on water. The middlings and flour in the meantime passing through the sieve are thus separated from the impurities. Such part of the middlings and flour as may fail to pass through the sieve will fall from the lower edge into the long elevator-box, whence they will be again returned to the top edge of the sieve to be worked over. Before reaching the top edge of the sieve they fall from the elevator-buckets onto the interposed wicket-boards P, which distribute the middlings or flour again evenly upon the sieve. These wicket-boards may be pivoted at each end of the machine, so as to receive any desired lateral inclination necessary to cause an even flow of the material on the face of the sieve at its upper side. In constructing these wicket-boards we use two or more boards arranged one above the other about an inch apart, each board extending out beyond the one above it, as shown in Fig. 4. These wicket-boards catch the falling material from the elevator-buckets just above the sieve to impede its fall and cause an equal and uniform flow. The space left between the wicket-boards gives the air-currents a better chance to gather and carry the fluff to the dust-room.

We have ascertained by actual experiments that by the working of the bran in with the middlings we secure an excellent collection of the fluff. The bran acts upon and attracts the fluff, which we are enabled to collect perfectly without the use of the fan which is employed in all purifiers.

Above the sieve-chamber we construct a flume or the air-chamber Q, extending from end to end of the machine, connected by a passage, $q$, with the fan-chamber R. From the air-chamber Q openings $q'$ are made into the sieve-chamber, controlled by paddle-valves $q''$, whereby we are enabled to apply aspirating air-currents above the sieve and controllable for extracting the fluff. The fan in the chamber R is secured to and operated by the main driving-shaft, and connected, as described, with the flue Q. Power is transmitted from the main shaft by a quarter-twist belt to a pulley, S, fixed upon a shaft working in a bearing or stud, T, on the top of the machine, and thence by belt to the top elevator-shaft, J, on which is a pulley, V.

Figures 6, 7, 9:
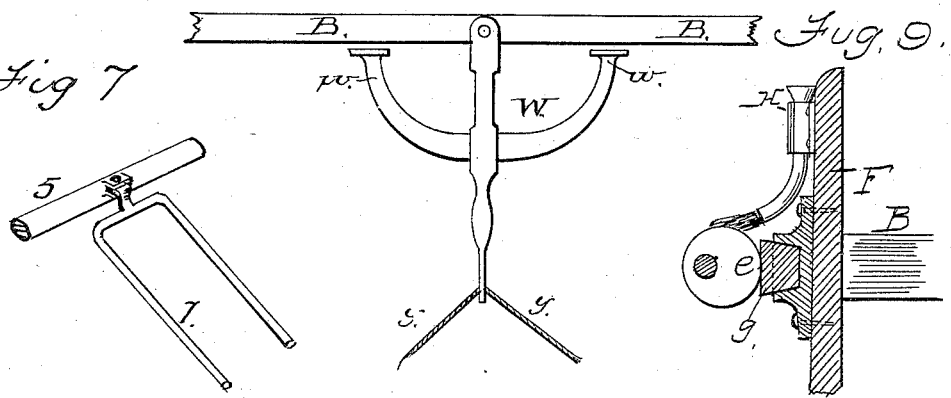

Beneath and suspended to the bar B' we construct a swinging or pendulum knocker, W, as shown in Fig. 6, for the purpose of giving the sieve a perpendicular jar or motion, while at the same time the sieve has a horizontal vibration. This pendulum-knocker is put in motion by its own gravitation, being suspended from a moving or vibrating sieve. We have tested by actual experiments that by the aid of this knocker the vibrating sieve works much more freely. It is evident that as the knocker W swings to and fro the arms $w\ w$ will alternately strike against the bar B and give the sieve a perpendicular motion. The action of this pendulum-knocker may be regulated and controlled by the cord Y, reaching from the lower end of the knocker to the opposite ends of the machine-frame, as by loosening or tightening said cord the stroke of the knocker may be made either light or heavy. This knocker can be applied with advantage to any vibrating bolting device.

On one end of the elevator-shaft J is formed a worm-gear, 1, which engages with a gear-wheel, 2, journaled in a bracket secured to the end of the machine. A counter-shaft, 3, has a crank-arm formed on one end, to which is secured a pitman, 4, which is attached at its outer end to a sliding bar, 5, which slides in bearings 6 6, secured to the main frame A of the purifier. To this sliding bar is loosely attached, by any suitable means, a series of wire or wooden arms, 7, which extend down over the surface of the sieve.

It will be readily seen that as the shaft J revolves movement will be communicated to the sliding bar 5, (carrying the arms,) through the medium of the crank counter-shaft 3 and pitman 4, whereby the sieve will be prevented from becoming clogged or stopped up with fluff or dirt, which is often the case when working very fine material.

Having thus described our invention, what we claim as new, and desire to secure by Letters Patent, is—

1. The knocker F, in combination with the box-casting G, provided with the packing $g$, and the eccentric $e$, substantially as and for the purpose set forth.

2. The knocker F, provided with the box-casting G, having the packing $g$, in combination with the oil-cup H, a wick, $h$, and the eccentric $e$, all constructed to operate substantially as and for the purpose set forth.

3. The sieve C, composed of sections, and having a lateral inclination, in combination with elevator-buckets of equal length with the sieve, chain belts $k$, and sprocket-wheels K, substantially as and for the purpose set forth.

4. The wicket-boards P, constructed as described, and consisting of boards with an air-passage between, in combination with the elevator-buckets L, extending the whole length of the sieve, substantially as and for the purpose herein set forth.

5. In a middlings-purifier, the suction-fan R, secured to the main shaft D, passage $q$, and flue Q, provided with openings $q'$, in combination with the sieve C and paddle-valves $q''$, all constructed to operate substantially as and for the purpose set forth.

6. In a middlings-purifier, the worm-gear 1, gear-wheel 2, and counter-shaft 3, in combination with the pitman 4, sliding bar 5, and loosely-attached arms 7, all constructed to operate substantially as and for the purpose set forth.

JAMES JONES FAULKNER.
ELZA TAYLOR FAULKNER.

Witnesses:
J. P. BOSTICK,
J. B. RITCHEY.